(12) United States Patent
Benner, Jr.

(10) Patent No.: US 7,756,174 B2
(45) Date of Patent: Jul. 13, 2010

(54) LASER PROJECTOR SAFETY MONITORING SYSTEM

(76) Inventor: William R. Benner, Jr., 3214 Regal Crest Dr., Longwood, FL (US) 32779

( * ) Notice: Subject to any disclaimer, the term of this patent is extended or adjusted under 35 U.S.C. 154(b) by 0 days.

(21) Appl. No.: 11/814,310

(22) PCT Filed: Jan. 19, 2006

(86) PCT No.: PCT/US2006/001988

§ 371 (c)(1),
(2), (4) Date: Jul. 20, 2007

(87) PCT Pub. No.: WO2006/078877

PCT Pub. Date: Jul. 27, 2006

(65) Prior Publication Data

US 2008/0123708 A1    May 29, 2008

Related U.S. Application Data (60) Provisional application No. 60/645,543, filed on Jan. 19, 2005.

(51) Int. Cl.
*H01S 3/00* (2006.01)
(52) U.S. Cl. ................ 372/38.09; 372/6; 372/24
(58) Field of Classification Search ............ 372/6, 372/38.09, 24
See application file for complete search history.

(56) References Cited

U.S. PATENT DOCUMENTS

| | | | |
|---|---|---|---|
| 4,006,970 A | 2/1977 | Slater et al. | |
| 5,130,838 A | 7/1992 | Tanaka et al. | |
| 5,546,139 A | 8/1996 | Bacs, Jr. et al. | |
| 6,580,560 B1 | 6/2003 | Benner, Jr. | |
| 6,661,820 B1 | 12/2003 | Camilleri et al. | |
| 6,867,753 B2 | 3/2005 | Chinthammit et al. | |
| 6,919,892 B1 | 7/2005 | Cheiky et al. | |

(Continued)

FOREIGN PATENT DOCUMENTS

JP    2000194302    7/2000

OTHER PUBLICATIONS

O'Hagan, "A Risk Assessment Methodology for the Use of Lasers in the Entertainment Industry", John B. O'Hagan, Doctoral Thesis, 47-77.*

(Continued)

*Primary Examiner*—Minsun Harvey
*Assistant Examiner*—Joshua King
(74) *Attorney, Agent, or Firm*—Allen, Dyer, Doppelt, Milbrath & Gilchrist, P.A.

(57) ABSTRACT

An apparatus and method for a laser light projector, including a laser beam generated by a laser light source; a scanner associated with the laser light source and having one or more moving mirrors capable of scanning the laser beam along X-Y coordinates; a power meter positioned for quantifying the laser beam's power in real time; a fault detector operably connected in the laser light projector to detect a fault condition and automatically generate a fault signal in response thereto; a modulator responsive to the fault signal for reducing power in the laser beam; and a fault shutter operably associated with the laser light source and responsive to the fault signal so as to shut off the laser beam.

14 Claims, 6 Drawing Sheets

U.S. PATENT DOCUMENTS

| | | | |
|---|---|---|---|
| 7,190,329 | B2 | 3/2007 | Lewis et al. |
| 7,301,558 | B2 | 11/2007 | Gluck |
| 2002/0167974 | A1* | 11/2002 | Kennedy et al. ............. 372/10 |
| 2005/0024704 | A1* | 2/2005 | Sakai ......................... 359/212 |
| 2006/0139319 | A1 | 6/2006 | Kariathungal et al. |
| 2007/0279494 | A1 | 12/2007 | Aman et al. |

OTHER PUBLICATIONS

Benner, Jr., William R., "New Tools for Eye-Safe Measurements," The Laserist, vol. 8, No. 2, pp. 11 and 14, Spring 1997.

Benner, Jr., William R., "Tools to Keep Audience Scanning Safe," The Laserist, vol. 8, No. 3, pp. 11-13, Summer 1997.

Benner, Jr., William R., "Evaluating Audience Scanning Effects," The Laserist, vol. 8, No. 4, pp. 8-9, Fall 1997.

Benner, Jr., William R., "Laserists Tackle Scanning Safety Issue," The Laserist, vol. 9, No. 4, pp. 5 and 18, Winter 1998.

Benner, Jr., William R., "Making Shows Safe and Enjoyable," Internet article, published in 1997, [online], Retrieved from the ILDA Technology website using Internet <URL:http://www.laserist.org/ilda/showsafe.shtml>.

* cited by examiner

LASER PROJECTOR SAFETY MONITORING SYSTEM

RELATED APPLICATION

This application claims priority from co-pending U.S. provisional application Ser. No. 60/645,543, which was filed on Jan. 19, 2005, and which is incorporated herein by reference in its entirety.

FIELD OF THE INVENTION

The present invention relates to the field of laser projectors and, more particularly, to a laser projector for projecting patterns and arrays of beams directly into an audience for entertainment display purposes

BACKGROUND OF THE INVENTION

Projectors for laser display can generally be categorized into one of three groups: graphics projectors, beam projectors, and audience scanning projectors.

Graphics projectors are those which project logos, text and other figures onto some projection surface such as a screen. To create images, these projectors employ an X-Y scanning system, usually consisting of two small mirrors mounted on galvanometer scanners. One mirror scans the beam in one linear direction (for example, horizontally) onto the second mirror, which scans the beam in the perpendicular direction (for example, vertically). The combined X-Y motion is normally used to draw outline-type vector images, using a point-by-point "connect the dots" method, according to software commands effected by a programmable controller operably connected with the laser projector. The audience views these figures on the screen in the same way that an audience would view a movie being projected onto a screen.

A beam projector produces beams of light that are projected into mid-air. The beams are viewable in mid-air by virtue of fog, dust and moisture that either exists in the air or which is created by the performer or venue. The beams are often animated to produce a dynamic effect. The beams can be moved and animated in a number of ways. For purposes of this invention, an X-Y scanning system is also used. The scanning system may be identical to that of graphics projectors (the projector is merely aimed into the air instead of at a screen), or the scanning system may scan more slowly than that of graphics projectors (since complex images may not be required). Use of an X-Y scanning system allows flexibility to create both simple placement of the beam to hit target mirrors or objects and also to allow more complex patterns such as circles and shapes to be projected.

With both graphics and beam projectors, the generated light, typically a laser beam, never comes in contact with the audience. The light merely travels from the projector to its destination surface, or along an uninterrupted path in mid air.

Figure 4:
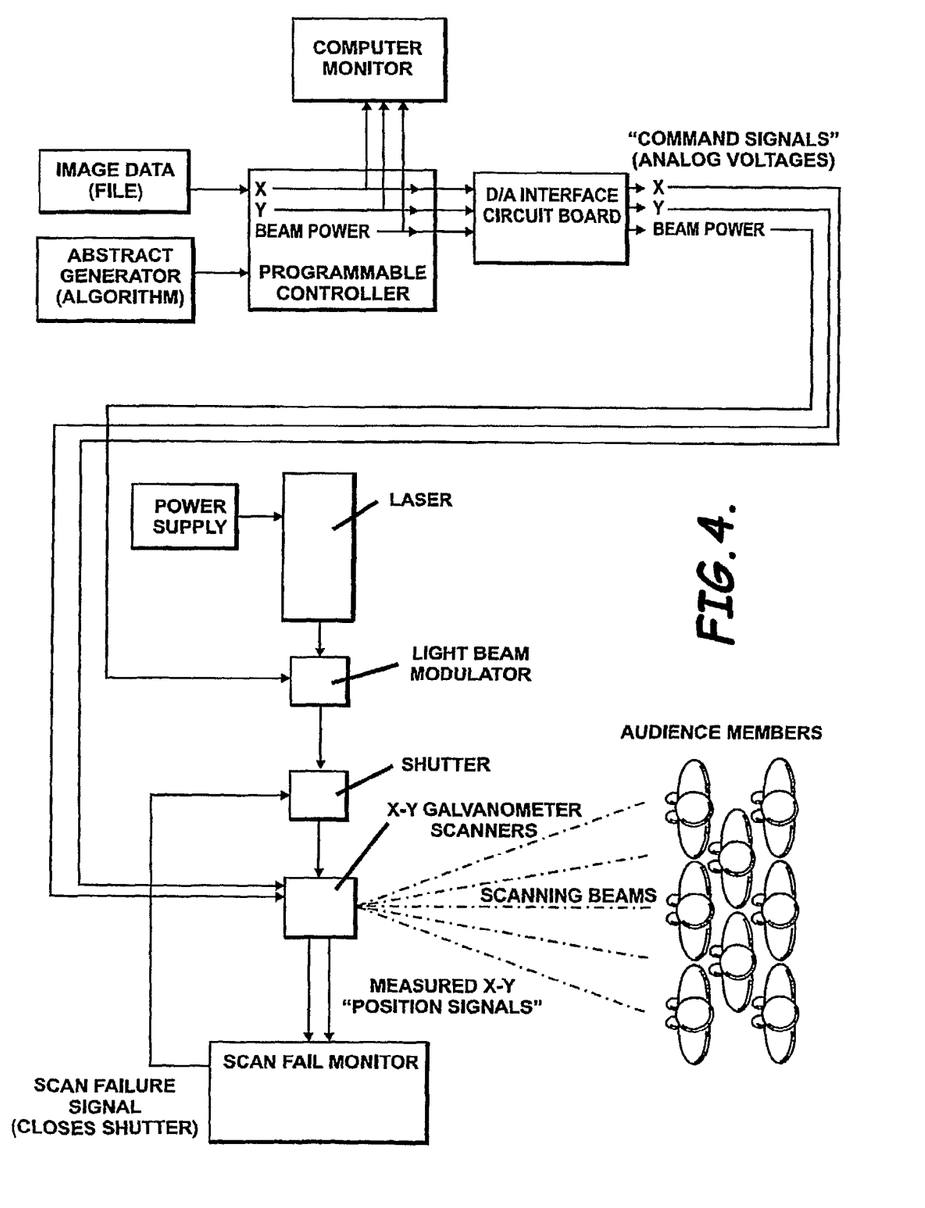
FIG. 4 shows a schematic diagram of a prior art audience scanning laser projector.

Audience scanning projectors typically combine features of both graphics and beam projectors. Audience scanning projectors use X-Y scanners to project geometric figures, patterns and arrays of light beams directly into a viewing audience. As with beam projectors, when the laser is projected toward an audience, its beam also illuminates any fog, dust, and moisture in the air. The beams create dancing sculptures that are very pleasing to audience members and the beam comes in direct contact with the audience. The generated effect creates the illusion of being surrounded by a tunnel of light and by other geometric shapes that are formed by the light. One viewer has compared it to being inside a fireworks display, or at the bottom of a swimming pool filled with light. A typical audience scanning projector, as known in the art, is shown in FIG. 4. It should be noted that while audience scanning projectors are common in many foreign countries, safety considerations and legal liability have made it difficult in the U.S. to gain approval from regulatory agencies and from customers for scanning an audience.

In the case of each of the three projector types described above, the X-Y signals and beam power level signals are generated by a programmable controller which generally comprises a personal computer having suitable interface hardware, and running software for generating the images, patterns and shapes. The hardware generally includes an interface circuit board that connects to the computer. This interface circuit board includes digital-to-analog converters and voltage amplifiers, so that signals can be produced which correspond to X-Y beam positions, and to beam power levels. The X-Y beam positions and beam power levels produced by the interface hardware are sometimes referred to as "command signals," since these signals represent the software's intention for the projector to follow. The software program generates the X-Y beam positions and beam power level "command signals" and periodically transfers these as digital data to the digital-to-analog converters in the interface circuit board. Those skilled in the art will know that any suitable interface hardware and software may be used to control any of the three projector types mentioned above. However, in the present invention preferred hardware and software systems include the QuadMod™ series of hardware boards and Laser-show Designer™ series of laser software, both from Pangolin Laser Systems, Orlando, Fla.

When projecting a laser beam toward a viewer, eye safety is a major concern. If an intense laser beam were to stop scanning and stopped directly on the pupil of a viewer's eye, retinal damage can occur if the beam has sufficiently high power and a sufficiently long dwell time. Likewise, even if the beam is not stopped but is scanned across the pupil of an eye, it can still cause retinal damage if the beam power is high enough, or if the beam is scanning slowly enough.

Figure 5:
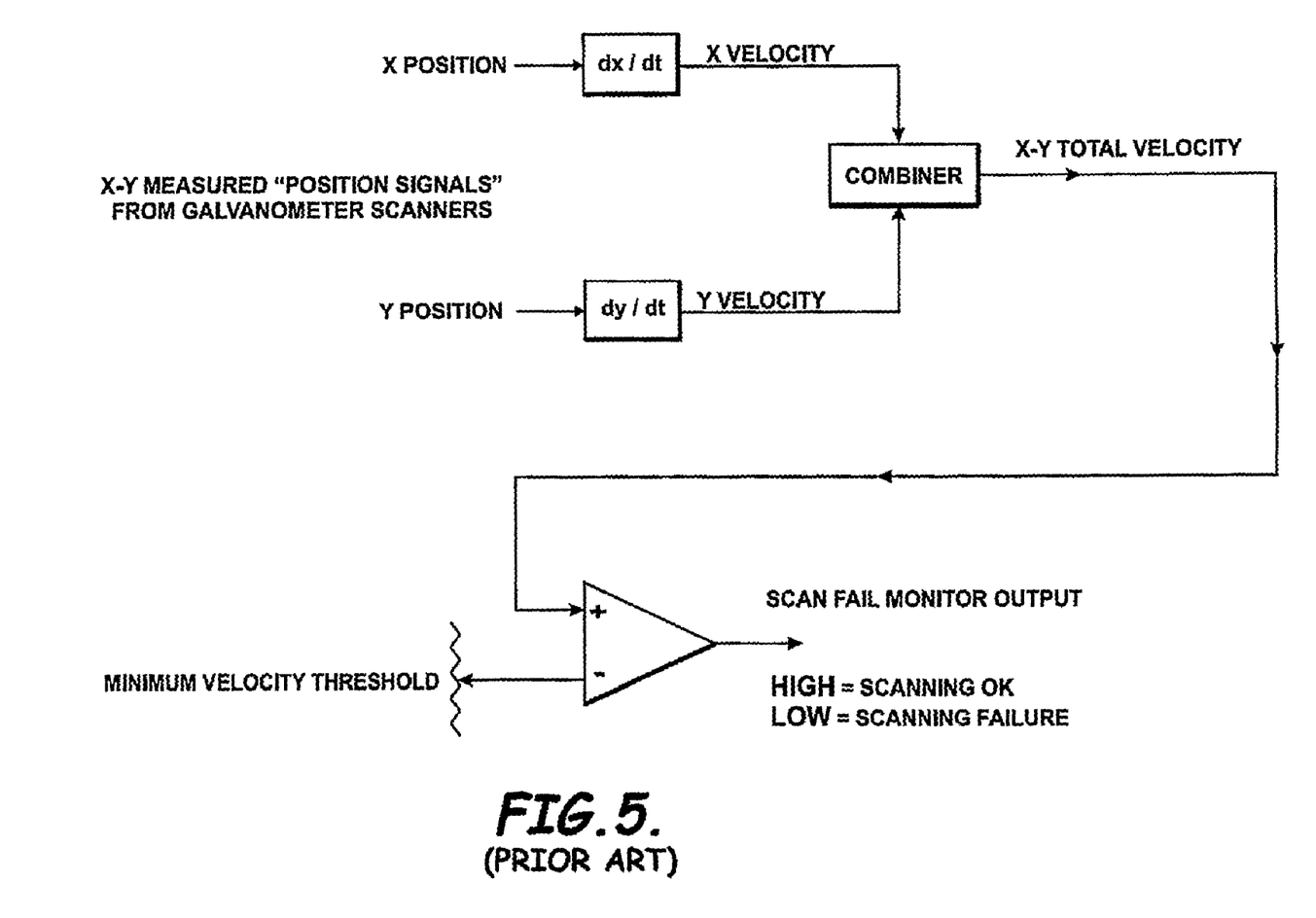
FIG. 5 is a schematic of a prior art scan fail monitor for a laser projector.
Figure 6:
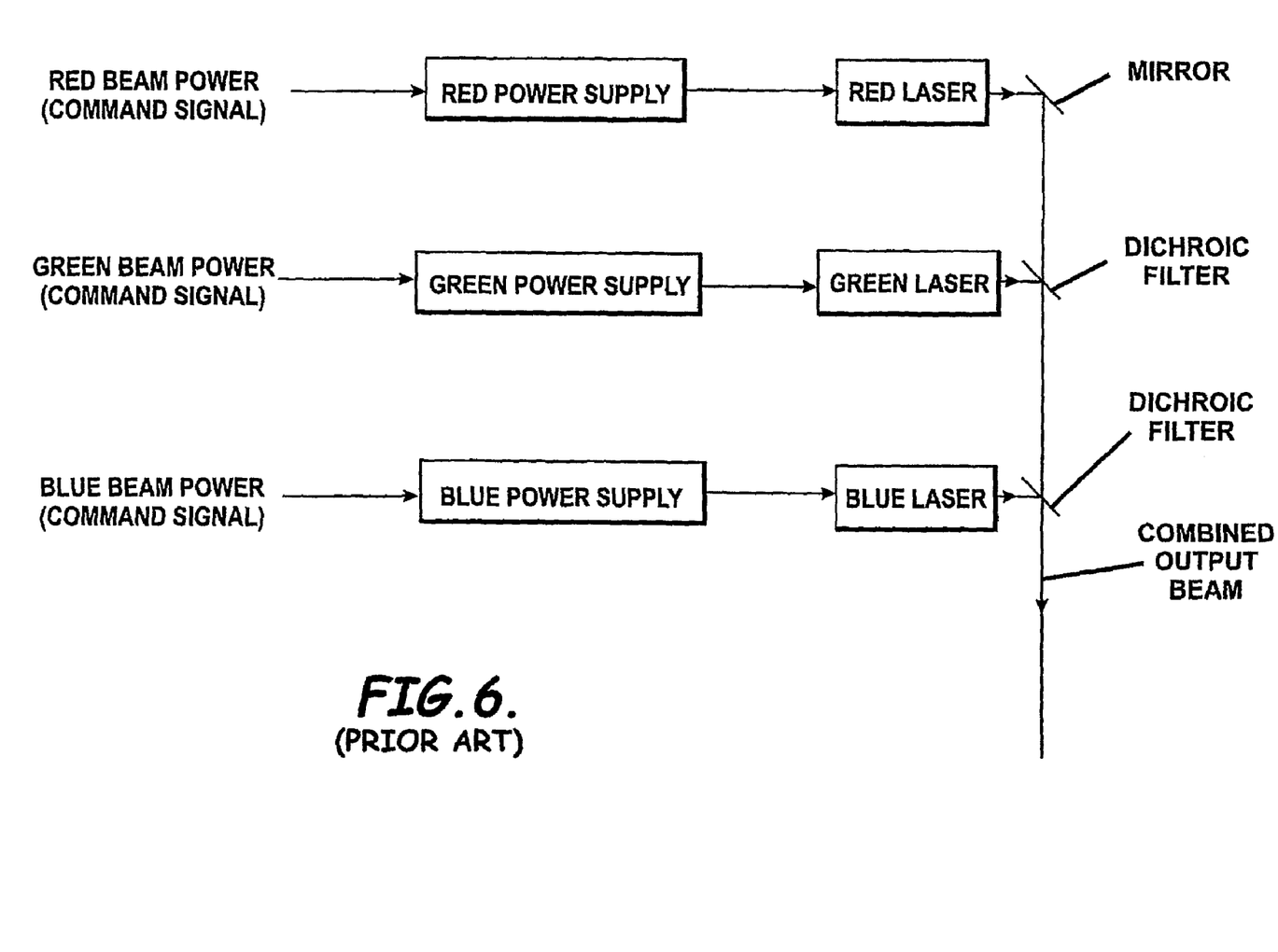
FIG. 6 illustrates how separate colored lasers may be combined into a single beam, as known in the prior art.

In audience scanning projectors in the current state of the art, the X and Y beam position signals generated by the X-Y scanners are mathematically differentiated to produce an output equivalent to X and Y beam velocity. The X and Y beam velocities are added together to produce the total beam velocity. This total beam velocity is monitored and compared to some pre-set minimum allowable velocity to make sure that the beam velocity is sufficiently high. If the beam were to stop scanning, producing zero velocity, or if the velocity were to otherwise drop below some preset threshold, this would be considered a "scanning failure." Under a scanning failure condition, the beam may be completely turned off by the light beam modulator or by a shutter. This type of system is called a "scan-fail monitor". Note that a scan-fail monitor is most often implemented in the form of analog signal conditioning components, but may also be implemented with computer hardware and software. A typical scan-fail monitor as know in the art is shown in FIG. 5.

While scan-fail monitors provide some level of protection for the audience, there are a number of problems that still remain. First, a scan-fail monitor does not provide automatic power level control in different regions of the scan field. For example, scan-fail monitors are not capable of allowing a higher power level over the audience's heads or below their eyes. Second, scan-fail monitors can be easily "fooled" into believing that there is a safe condition when there is not, because they only monitor the rate of change of position and do not track the actual position of the beam. For example, if the beam alternates between two fixed locations, thereby concentrating 50% of the beam power in each position, the scan-fail monitor may allow this condition since the beam is technically scanning. However, in many instances, a 50% concentration of beam power could be hazardous. Therefore, improvements are still required over the use of a scan-fail monitor alone.

The actual process of evaluating the show material being projected into an audience is an extremely time consuming task which is prone to error. The current state of the art requires a beam power meter capable of measuring irradiance (beam power per unit area), a fast silicon photodiode, an oscilloscope, a scientific calculator, and sufficient skill to use these instruments. The beam power meter must be used to measure the "static beam irradiance at the closest point of audience access". The fast silicon photodiode and oscilloscope are used together to measure the pulse characteristics of the scanning light beam. Finally, the scientific calculator is used to perform calculations using the irradiance and pulse characteristics to evaluate whether the effect is safe or not.

While performing an evaluation of the show, each effect must be evaluated for three separate criteria, often termed maximum permissible exposure (MPE) levels, as described in well established safety standards including the IEC 60825-1 and the ANSI Z136.1. The three criteria are the single pulse MPE, multiple pulse MPE, and average power MPE. The scanning effect must not exceed any of these three MPE levels in order to be considered safe.

The terms "single pulse" and "multiple pulse" refer to a phenomenon that the human eye perceives due to the scanning action. When a laser beam scans across the pupil of the viewer's eye, it is the to deliver a pulse of laser light to the viewer's eye. This is because as the beam scans past the viewer's eye, it will only enter the eye for a brief time, depending on the beam diameter and the scan rate. This perceived pulse of light created by the scanned beam is similar to a pulse that is created by a beam which is not scanning, but is turned on for only a brief instant. The amount of time that the beam is on within the viewer's pupil is called the pulse width. For audience scanning shows, this pulse-width is typically between about 20 to 500 microseconds.

When an audience scanning effect is being projected, such as a tunnel or sheet scan, this is done by repeatedly scanning the tunnel or sheet to make it appear solid. As the beam crosses the viewer's eye, it will generate a pulse of light entering the eye. Since the X-Y scanners will trace this effect many times to make it appear to be solid, the viewer's eye may receive multiple pulses of light if the effect and viewer are stationary. The reason why pulses and multiple pulses are important, is that safety standards prescribe a maximum amount of light, that is, a maximum permissible exposure (MPE) that the viewer can be receive for a single pulse, and for multiple pulses.

During the show evaluation process mentioned above, the show must essentially be in a "paused" state while measurements can be taken, and these measurements typically require several minutes per effect. This means that if a show has hundreds of different effects, a considerable amount of time must be spent evaluating the show material. Moreover, if an effect does exceed any of the MPE levels mentioned above, the effect must be "re-programmed" so that a safe show can be produced.

There are several pieces of software on the market to aid in the task of safety evaluation and calculation of MPE levels. While the use of software in the current state of the art can remove some of the tedium and possible human error when performing many calculations, there is currently no software that can run in real time to evaluate scanning beams on the fly, and automatically reduce power levels when needed. In addition, all software programs in the current state of the art require that the user know many projection parameters which may not be readily known or easily determined, such as scan angle, actual beam diameter at the laser projector, and actual beam divergence that exists as a function of the laser and of projection system components.

The current invention completely eliminates the need for manual and tedious evaluation of the scanned laser output. Moreover, it constantly monitors a number of scanning and power related parameters and can extinguish the beam in the event an unsafe condition is detected.

SUMMARY OF THE INVENTION

With the foregoing in mind, the present invention discloses the components used in a safe audience scanning projector that incorporates electronic circuitry that performs a number of safety related functions. Additionally, the presently described audience scanning laser projector includes a real time laser power meter, a safety shutter, a fast beam modulating device and a control panel. Those skilled in the art should be aware that the disclosed fault shutter, also called a safety shutter, is one that is in addition to the one or two shutters typically employed in laser projectors. It should also be pointed out that the safety circuitry may monitor and respond to a signal identified as an "S" coordinate generated by the programmable controller which controls the laser projector. Accordingly, the safety circuitry comprises an electronic circuit that monitors a number of system parameters and can blank the laser and close the fault shutter in the event of a fault condition. Blanking and shutter are preferably kept activated until the fault condition is cleared and the user manually resets the system using a two-step reset sequence. Note that the user cannot merely hold down the reset button and keep the system in a "ready/no fault" state.

In the detailed description that follows, the skilled will appreciate that in one embodiment of the present laser light projector comprises a laser beam generated by a laser light source, and a scanner associated with the laser light source and having one or more mirrors capable of scanning the laser beam along X-Y coordinates. Also included are a power meter positioned for quantifying the laser beam's power in real time and a fault detector, which could be the circuitry mentioned, and which is operably connected in the laser light projector to detect a fault condition and automatically generate a fault signal in response thereto. A modulator is responsive to the fault signal for reducing power in the laser beam and a fault shutter operably associated with the laser light source is responsive to the fault signal so as to shut off the laser beam.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
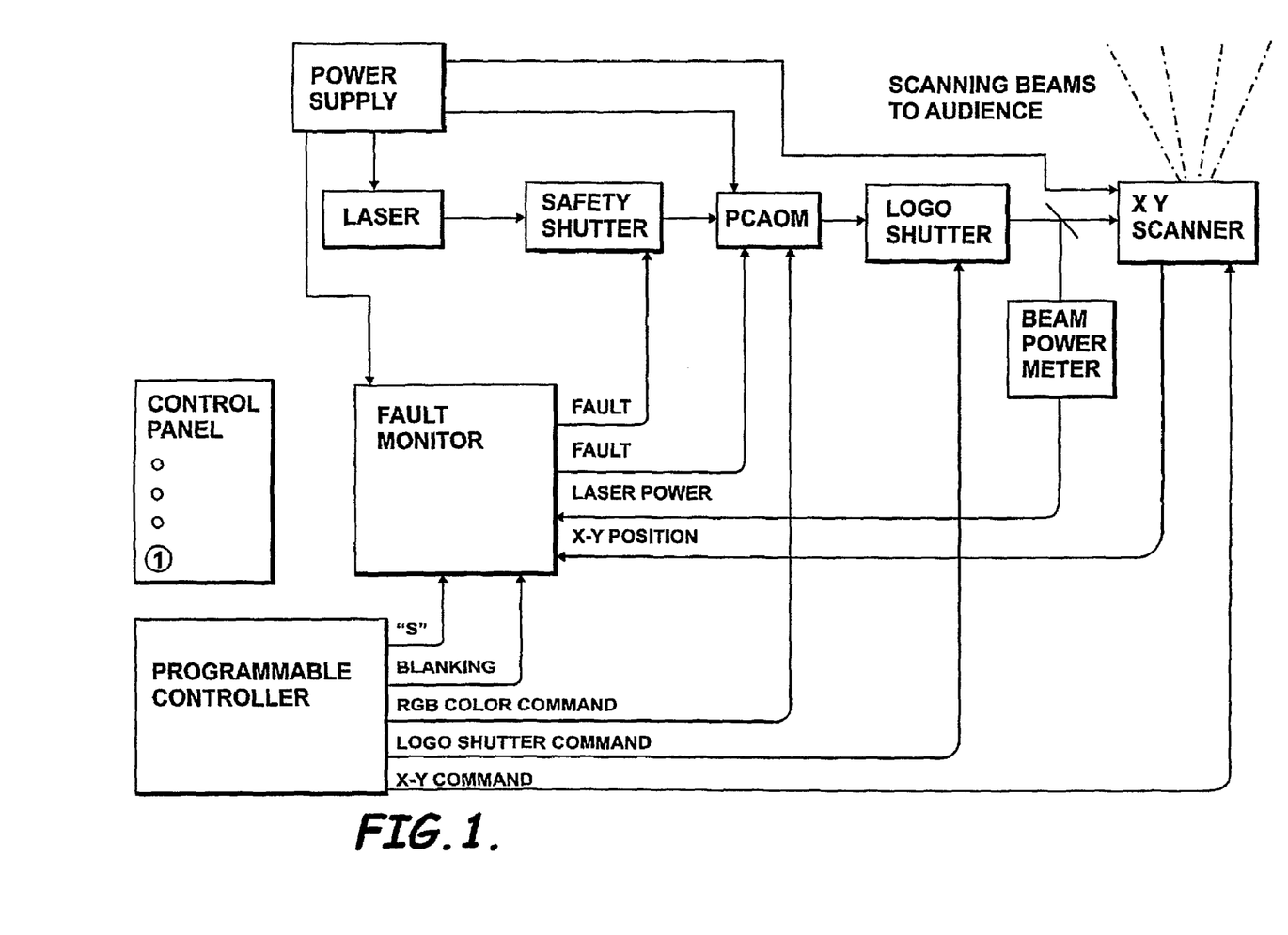
FIG. 1 is a schematic diagram of a laser projector for scanning an audience, according to an embodiment of the present invention.
Figure 2:
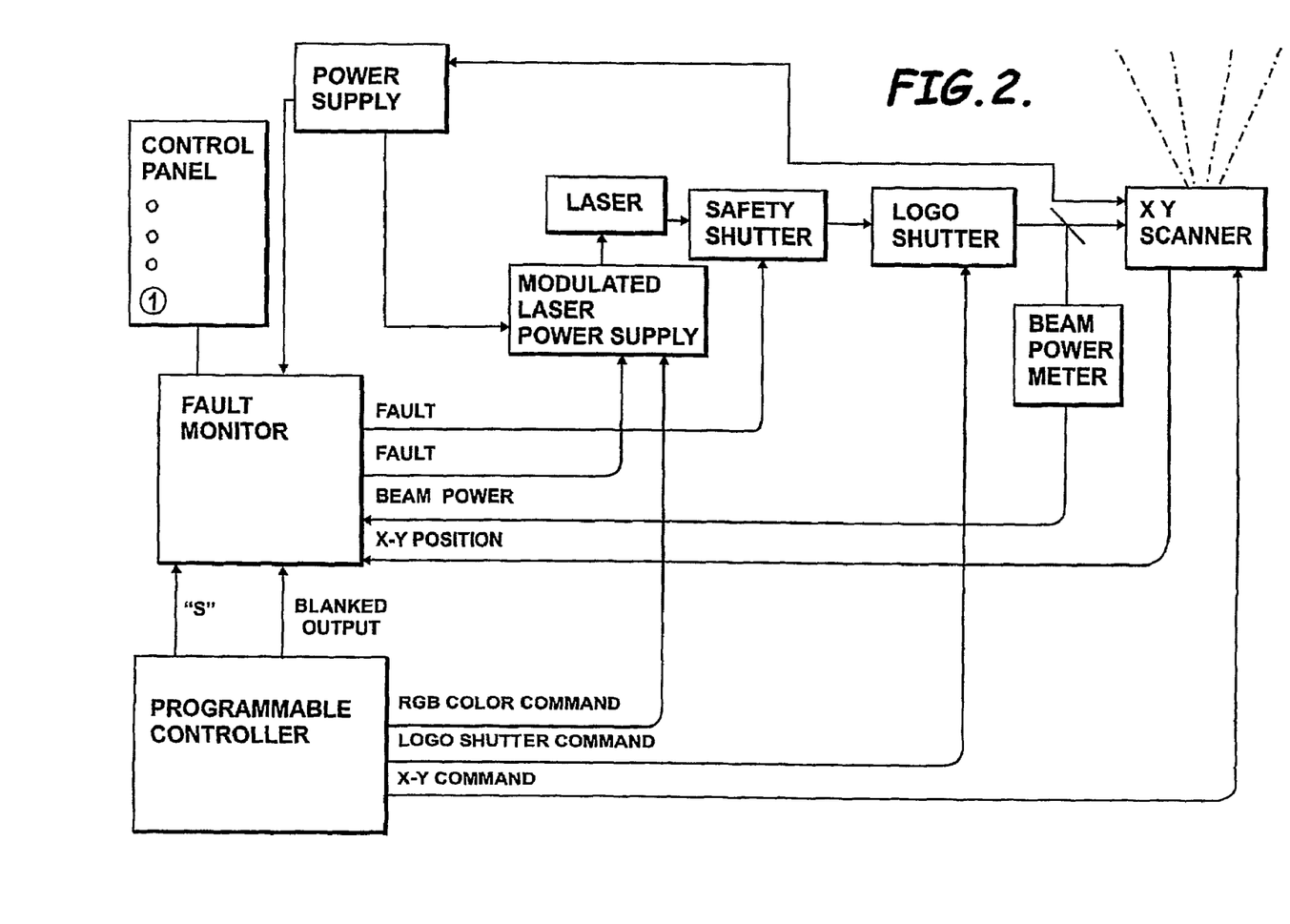
FIG. 2 depicts a diagram of another embodiment of the present laser projector for scanning an audience.
Figure 3:
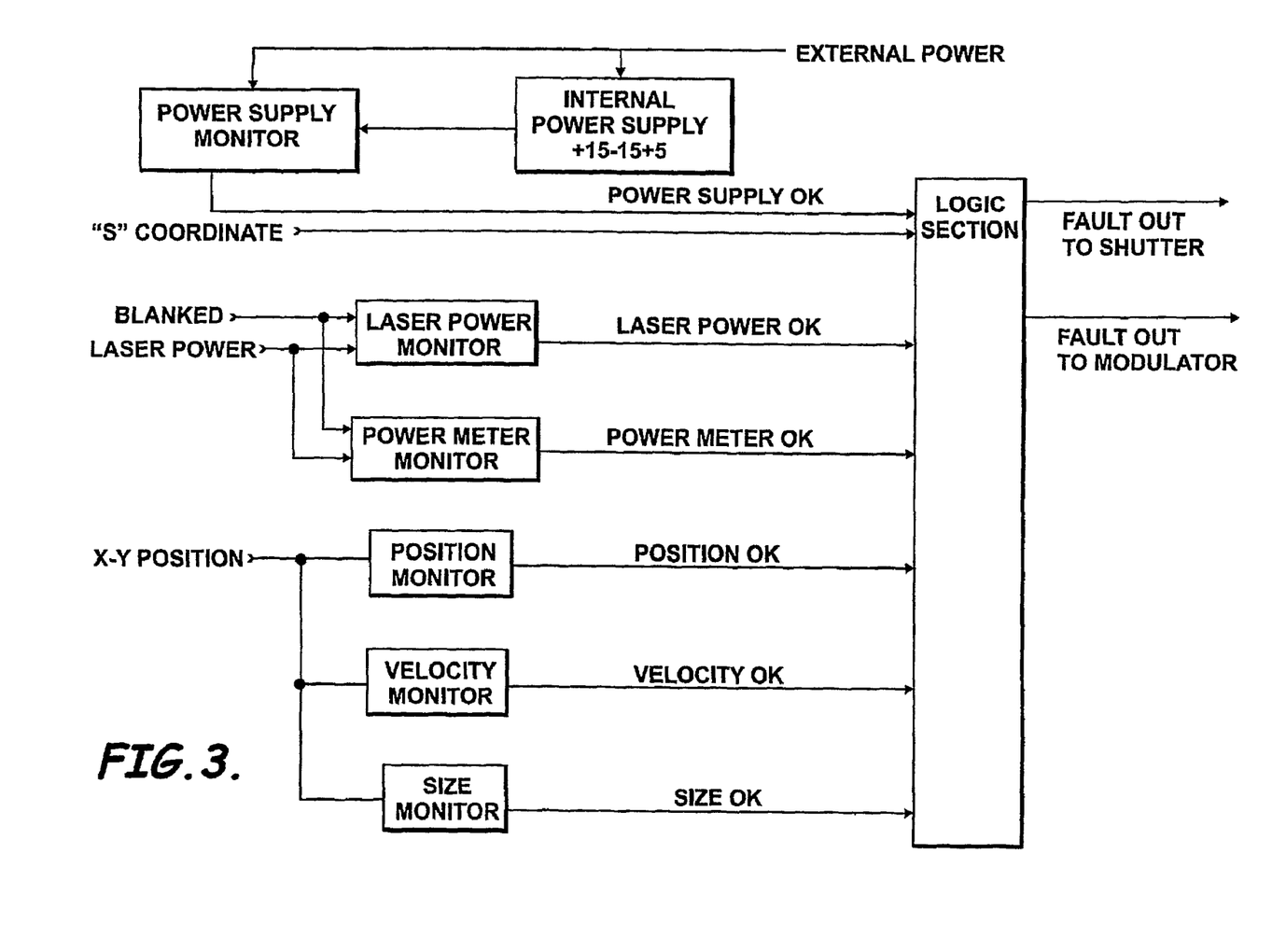
FIG. 3 is a diagram showing the electronic circuitry which detects fault conditions in the present laser projector.

FIGS. 1 and 2 illustrate a laser light projector comprising a laser beam generated by a laser light source. A scanner is associated with the laser light source and preferably has a plurality of moving mirrors capable of scanning the laser beam along X-Y coordinates. A power meter is positioned for quantifying the laser beam's power in real time. A fault detector is operably connected in the laser light projector to detect a fault condition and automatically generate a fault signal in response thereto. A modulator is responsive to the fault signal for reducing power in the laser beam. A fault shutter operably associated with the laser light source and is responsive to the fault signal so as to shut off the laser beam. As noted above, the fault shutter is additional to the standard shutter or shutters for operating a laser projector. That is, the safety or fault shutter is used in addition to the projector's normal "logo shutter" or "beam shutter". An example suitable for use in the present invention as the safety shutter is LST400 from NM Laser Products, which is a fast, high-reliability, fail-safe design. This shutter can completely prevent all laser output within 20 milliseconds of command. The shutter prevents passage of the laser beam in the absence of a "shutter open" command signal.

By way of non-limiting example, in the present invention the real-time laser power meter preferably comprises a measuring head such as model number SEL033 and an optical amplifier board such as model A430, both from the company International Light. The power meter is used to constantly monitor the power of the laser beam that is being emitted from the laser projector. The electronic circuitry employs this information to verify that the laser power does not exceed a predetermined level and also to ensure that the beam power does not exceed 1 milliwatt when the beam is commanded to be blanked.

The beam modulator device is preferably a polychromatic acousto-optic modulator (PCAOM). The modulator is used by the show programming to control the beam color and intensity, and it is also used by the electronic circuitry to blank the laser beam. This component is preferably able to reduce laser output to below 1 mW within 10 microseconds of command. Alternatively, the beam modulator device could actually be the power supply feeding the laser, such as would be the case for directly modulated solid state lasers.

A control panel associated with the presently disclosed laser projector may be integral with the projector or may be a connectable add-on device. Typically, the control panel would include LED status monitors which indicate the status of the power supplies, beam power, beam velocity and fault conditions. The control panel preferably also includes an emergency stop switch and a system reset switch to restore the system after a fault condition has been raised.

A preferred beam path in the presently disclosed laser projector is as follows. The beam is emitted by the laser source and passes first through the fault shutter. From there, it is directed through mirrors, the logo shutter (sometimes called the beam shutter), PCAOM and other customary optics on its way to X-Y galvanometric scanners. Before going to the X-Y scanners, the beam passes through the real-time laser power meter, and then finally to X-Y scanners and out toward the audience.

The electronic circuitry accomplishes a number of safety related functions in the present laser projector, as follows. The circuitry monitors the power supply that feeds the X-Y scanner servo drivers and the instantaneous beam velocity caused by the scanning action. The circuitry also monitors the size of the generated effect to make sure that the effect is sufficiently large for the audience and for the intended show. Additionally, the circuitry monitors the beam power to ensure that a predetermined maximum safe power is not exceeded. Moreover, the circuitry monitors the beam power to ascertain that there is no laser output when blanked and that the beam power meter is working properly. Beam position is also monitored to determine if effect position is over the heads of the audience. Yet additionally, the circuitry monitors the "S" signal from the programmable controller, which indicates the level of hazard potential. The circuitry also monitors its own health, indicates various status conditions for the user, preferably via an associated display, and provides for emergency stop and reset. These features are further described below so that the skilled may fully understand the disclosed invention.

Power Supply Monitor

The purpose of the Power Supply Monitor is to monitor the power supply voltages that feed the scanner servo drivers, and also to monitor power supply voltages within the electronic circuitry itself. If any of these power supplies are not sufficient to ensure proper operation of the scanner servo drivers and electronic circuitry, a fault condition is raised and both the shutter and blanking signals are set to a state that prevents laser output.

The power supply monitor comprises one or more comparators, and one relay. The comparators monitor the +/−24V feeding the scanner servo drivers, and the +/−15V that are derived on the electronic circuitry, as well as the +5V derived thereon. If any of these voltages is out of tolerance, the POWER_OK signal within the electronic circuitry is brought low, and subsequently, the logic circuit will bring the READY signal low, which closes the safety shutter, and blanks the laser. Since the logic circuits are powered by 5V and might not operate properly if the 5V power supply is not present, a relay is also used, which is powered by the 5V supply. If the 5V supply is not present, the relay will not energize, and the shutter and blanking signals are perpetually maintained in a state which prevents laser output.

Scanning Velocity Monitor

The purpose of the scanning velocity monitor is to monitor the beam velocity that is caused by the X-Y scanning action. If the beam velocity falls below a predetermined level, and maintains this low velocity condition for a predetermined amount of time, the blanking signal is set to a state that reduces the laser power to a level below 1 mW.

The scanning velocity monitor includes operational amplifiers, analog multipliers and comparator circuits. The X and Y position signals from the X-Y scanner servo drivers are fed to operational amplifiers which are configured to take the first derivative of the each position signal, thus providing signals which are equivalent to the X and Y beam velocity. The X and Y beam velocity signals are then squared by multipliers and then these signals are added together. The result is a signal that is equivalent to the beam velocity squared. This signal is then compared with a constant voltage which represents a preferred minimum acceptable beam velocity (which is approximately 1 radian per second). If the beam velocity is above 1 radian per second, the comparator output will be shorted low. If the beam velocity is below 1 radian per second, the comparator output is relaxed, allowing a capacitor to charge. This capacitor charge voltage is then compared to a second voltage which represents that amount of time that the beam velocity may be below 1 radian per second (which is generally between 1 millisecond and 10 milliseconds). When the beam velocity is below 1 radian per second, for a period of time pre-set by the second comparator, then the "VELOCITY_OK" signal is brought low and the beam is blanked by the fast modulation device. Note that the squaring action of this "beam velocity squared" signal is very beneficial. If the beam velocity is 2 radians per second, it will be four times the nominal comparator voltage. Likewise, if the beam velocity is 0.5 radians per second, the voltage will be one quarter the nominal comparator voltage. Because of this, the beam velocity comparison is made very accurately.

Effect Size Monitor

The purpose of the effect size monitor is to measure the peak-to-peak AC signal level of the X and Y position signals, and ensure that they are sufficiently large for the effect to be safe.

The effect size monitor consists of operational amplifiers, AC coupling capacitors, rectifiers and a comparator. The X and Y signals are both buffered and inverted. The buffered (non-inverting) signal and the inverted signal are both fed through AC coupling capacitors and then rectified. The rectified signal is used to charge a DC capacitor which is simultaneously being discharged by a resistor. The instantaneous voltage across this DC capacitor is compared with a fixed voltage which represents the minimum acceptable size of an effect. When the effect is determined to be too small, then the "SIZE_OK" signal is brought low and the beam is blanked by the fast modulation device.

Note that since this circuit uses AC coupling techniques, which are then rectified and used to charge a DC capacitor, this circuit similarly works off of beam velocity and not merely the DC position. The component values of the coupling capacitors and DC capacitor are chosen to largely mirror those of the scanning velocity monitor. This was done purposely so there are effectively two sources of scanning velocity information which can be compared in the logic section. Thus, this provides redundancy. Also note that the minimum size is provided by the voltage drop which naturally occurs in rectifier diodes. Even if the velocity is sufficiently large to make it across the AC coupling capacitors, the signal will have to be sufficiently large to overcome the voltage drops of the diodes. It is therefore the diodes that provide the "minimum size" action of this circuit.

Maximum Safe Beam Power Monitor

The purpose of the maximum beam power monitor is to monitor the power of the laser beam that is currently being emitted from the laser projector, and initiate a fault condition if this laser power is too high.

The maximum beam power monitor consists of a real-time power meter head and optical amplifier board from International Light, and an analog comparator circuit. The head is placed in the beam path in such a way that it can constantly monitor the beam power that is going to the X-Y scanners. The head has a fast silicon detector, and a special filter which allows it to output a voltage that is representative of the laser beam power, regardless of the wavelength of the laser. The optical amplifier board amplifies the signal from the head and generates a 0-to-5-volt analog signal, which is proportional to the beam power. This 0-to-5-volt signal is compared with a constant voltage which represents the "maximum safe beam power" which should be used for safe operation (generally 250 mW or less). If this "maximum power" is exceeded, a fault condition is raised and both the shutter and blanking signals are set to a state that prevents laser output.

Blanking Beam Power Monitor

The purpose of the blanking beam power monitor is to monitor the power of the laser beam that is currently being emitted from the laser projector, and initiate a fault condition if the laser is outputting more than 1 milliwatt at a time when a blanked condition is being commanded.

The blanking beam power monitor uses the same 0-to-5-volt signal that is used by the maximum safe beam power monitor. When the "blanking" signal is in a state which indicates the beam should be blanked, a comparator is used to compare the 0-to-5-volt signal with a constant voltage which represents 1 milliwatt. If the 0-to-5-volt signal is above the "1 milliwatt" level, then a fault condition is raised and both the shutter and blanking signals are set to a state that prevents laser output.

Beam Power Meter Monitor

The purpose of the beam power meter monitor, is to monitor the output of the real-time beam power meter, and make sure that it is functioning properly.

The beam power meter monitor uses the same 0-to-5-volt signal that is used by the maximum safe beam power monitor and blanking beam power monitor. When the "blanking" signal is in a state which indicates the beam should be outputting some level of power (i.e. not blanked), a comparator is used to compare the 0-to-5-volt signal with a constant voltage which represents 1 milliwatt. If the 0-to-5-volt signal is below the "1 milliwatt" level, then a fault condition is raised and both the shutter and blanking signals are set to a state that prevents laser output.

Note that this is mutually exclusive with the blanked beam power monitor and thus, any beam-power-related fault will be detected (beam outputting when it should not be, beam not outputting when it should be, beam outputting too much power).

Beam Position Monitor

The purpose of the beam position monitor is to observe the Y position signal from the X-Y scanners. If the Y position signal is determined to be "above the horizon", then the scanning velocity monitor and maximum safe beam power monitor may be temporarily ignored, so that strong, bright beams may be projected over the audience's heads.

The beam position monitor includes an analog comparator an "enable/disable" jumper and logic circuitry. The Y scanner position is compared with a constant voltage which represents a value significantly over the heads of the audience. When the comparator output is low, indicating the beam is not above the heads of the audience, the logic circuits are in a state which will monitor the scanning velocity and maximum safe beam power. When the comparator output is high, indicating the beam is above the heads of the audience, the logic circuits are in a state that disables the effect of the scanning velocity monitor and maximum safe beam power. A jumper can be used to maintain the output of the comparator in a low state, thus permanently enabling the scanning velocity and maximum safe beam power.

Status Indicator LEDs

The purpose of the status indicator LEDs is to provide a visual indication of every stage in the system, and also provide a latching fault indication which indicates the problem that caused the fault, thus allowing the person to correct the problem and resume safe operation. The status indicator LEDs include LEDs and resistors which are placed at almost every stage in the electronic circuitry. The following LEDs and associated status messages are provided as non-limiting examples.

| Status Signal Name | Color | Comment |
| --- | --- | --- |
| Power Supply Fault | Red | Remains until the fault is cleared |
| Logic Fault | Red | Serious logic problem. System needs repair |
| Max. Power Exceeded | Red | Latches and will remain until reset |
| Blanked Laser Power Exceeded | Red | Latches and will remain until reset |
| Armed | Yellow | Reset button is active and may be pressed |
| Ready | Red/Green | Red = system fault, Green = system ready |
| Velocity | Yllw/Grn | Green = velocity is above 1 rad/sec |
| Position | Yllw/Grn | Green = position is above audience |
| Effect Size | Yellow | Indicates Effect is too small |
| Laser Output Commanded | Yellow | Indicates that color channels are driven |
| Laser Power | Yellow | Indicates laser is above 1 mW |
| Output Intensity/Blank | Yllw/Grn | Green = Beam is not blanked |
| Safety Shutter | Red | shutter closed |
|  | Green | shutter open |

Emergency/Stop

The electronic circuitry monitors an emergency/stop signal, which is normally facilitated by a red "mushroom" type switch. If the emergency/stop signal is placed in a state which indicates an emergency/stop condition, then a fault condition is raised and both the shutter and blanking signals are set to a state that prevents laser output.

Reset Condition and Button

The electronic circuitry monitors a "reset" signal. This reset signal is constantly observed, regardless of the state of the system. If the "ready" status is indicated and somebody pressed the Reset button, then the system will be brought out of the ready state and into a fault state. If the system is in a fault state, then it can only be reset if all faults are cleared AND the reset button is not being pressed AND the "armed" status indicator is illuminated. Pressing the reset button when the system is in the "armed" state will reset the system to the "ready" state. Note that if you press and hold the RESET button, the system will not remain in the READY state and in fact will constantly be in the FAULT state. The electronic circuitry is designed such that reset signal may actually be provided by a key switch instead of a push button.

Increased System Accuracy Using the "S" Coordinate

The accuracy of the electronic circuitry may be increased by observing a newly invented signal from the computer called "S" for "Safety". This is a "coordinate" that is output from the computer, in addition to the normal X, Y and RGB Color signals. Stated another way, the computer generates X, Y, R, G, B and "S" for Safety for each data point being output. This safety coordinate that is output from the computer carries additional information about the hazard potential of the current X, Y, R, G, and B coordinates. The S coordinate takes into account the current beam velocity, and number of times the beam has been commanded in the neighborhood of this X-Y location.

Voltage levels of S range from 0V indicating severe hazard to +5V indicating relative safety. Since this S coordinate is related to beam velocity, the S coordinate can be compared with the beam velocity computed by the scanning velocity monitor. If these two elements grossly disagree, then this would indicate a failure somewhere in the system. This failure could be in the computer system itself in failing to correctly generate the S signal, or in the scanning system for producing an incorrect scan velocity, or even in the electrical components of the electronic circuitry itself. In any event, the electronic circuitry can react to this observed failure by raising a fault condition and both the shutter and blanking signals would be set to a state that prevents laser output.

The electronic circuitry may include another enhancement which allows it to not only forcibly blank and shutter the beam, but also to vary the intensity of the laser based on the voltage of the S coordinate. Stated another way, the electronic circuitry could actively control the laser beam intensity based on the voltage of the S coordinate reducing the intensity in areas where greater hazard exists.

Since the programmable controller or computer system that feeds the projector is generating the X, Y, R, G, B and S coordinates, the computer system can provide a way of visualizing S on the computer monitor. For example, this visualization may be the color of a faint image that ranges from green indicating relative safety, to yellow indicating nominal hazard, to red indicating severe hazard. This faint image may be visible along with the normal visualization of the X, Y, R, G and B signals. Stated another way, there may be a mode of complete visualization which shows the normal laser image created by the X, Y, R, G and B coordinates and, overlaid within that image, another fainter image which shows this green-to-red color property of the S coordinate. The computer operator may observe this visualization and, as a result of this information, change their show material in such a way as to reduce the amount of red that is showing in the faint S visualization and thus, reduce the hazard potential of the show.

Reliability and Redundancy

The present invention includes a number of features which promote high reliability and redundancy. Various of the components which contribute to these ends are further discussed below.

Safety Shutter

The safety shutter is used in addition to one or two other shutters which normally exist in laser projectors. These other shutters (called the logo shutter and beam shutter) are controlled by the show production system (often a computer). This show production system opens and closes the shutters automatically as needed.

The safety shutter chosen for this project is a fast, reliable, fail-safe. If the shutter fails due to some mechanical problem, the design of the shutter is such that it will prevent laser output under the failure condition.

Note that the safety shutter is actually a redundant safety component in this system since the fast modulation device will always blank the beam to a power level below 1 milliwatt under any fault condition. In this way, the safety shutter is redundant, not only for the normal shutters, but also for the fast modulation device.

The safety shutter is opened by the presence of a 12-volt signal. If this signal is not present, the shutter will remain closed. In this way, even the electrical operation of the shutter is fail-safe.

Fast Modulation Device

The fast modulation device, or modulator, can reduce the beam power to below 1 milliwatt, within 10 microseconds of being commanded to do so. It is commanded to reduce laser power by the absence of a 5V "blanking/intensity" signal. Since the fast modulation device will not output greater than 1 milliwatt of laser light in the absence of this signal, it is electrically fail-safe. Note that this fast modulation device may be the power supply feeding the laser itself, for example, in self-modulated lasers.

Real Time Beam Power Meter and Monitor

The real-time beam power meter is a high-reliability, fast silicon detector which generates a 0-to-5-volt signal proportional to the amount of laser light being sent to the X-Y scanners. The electronic circuitry tests three different aspects of this signal. It verifies that this signal is not present when the system is supposed to be blanked. It also verifies that there is actually a signal present when the system is not supposed to be blanked. Also, it verifies that the maximum laser power is not exceeded. Due to the first two terms being mutually exclusive, any possible mode of failure of the beam power meter and monitoring system will generate a fault condition. Therefore, the real time beam power meter, and all related comparator and logic functions are fail-safe.

X-Y Scanners and Monitors

The X-Y scanners chosen for this project are not the type of scanners that are typically used in a laser projector. They are moving magnet scanners which do not employ a torsion rod. In addition, the rotor is twice as long as most other scanners, and the coil resistance is half that of other scanners. This combination allows these scanners to dissipate heat four times more effectively than scanners for a similar beam aperture. In all, the X-Y scanners are capable of dissipating 120 watts of drive power, which is in turn, four times as high as any drive signal that is expected.

The +/−24V power supply that feeds the scanner servo driver is monitored by the electronic circuitry. If this power supply is below +/−18V, the electronic circuitry will generate a fault condition. If the scanners fail, the velocity monitor aspect of the electronic circuitry will reduce laser output to a level below 1 milliwatt.

Design of Comparator Circuits

All comparators used in this design have are preferably of the "open collector" type. If this type of comparator fails, it will usually fail in such a way that the output transistor is shorted, and the output of the comparator stays low. In all circuits except one, the "output low" condition is a safe condition. In this way, the comparator design is fail-safe.

Velocity and Effect Size Monitors

Both the velocity monitor and effect size monitor observes the X and Y position signals from the scanner servo drivers. If either X or Y position signal is missing or does not have a sufficiently high signal level, the VELOCITY_OK and SIZE_OK signal will never be generated. In this way, these monitors are both fail-safe with respect to faulty incoming signals.

The velocity monitor incorporates a low pass filter. This low pass filter will prevent corruption and thus, prevent falsely indicating that the velocity is acceptable in the presence of noise or extraneous signals, examples of which include RF signals from a mobile radios or cell phones.

The velocity monitor incorporates a comparator circuit that is used in such a way that the safe condition is high rather than low as described above. However, another circuit monitors this signal and compares it against other signals as a "sanity check". If the signals inside the velocity monitor do not correlate to the X and Y position signals in a realistic fashion, a fault condition is generated.

Logic Sanity Monitor

The safety shutter and intensity/blanking outputs are both monitored and checked for consistency with internal logic nodes using a simple but reliable exclusive OR gate, as known to the skilled. If the proper signal relationships are not maintained, one or more exclusive OR signals will be brought low, disengaging the relay and grounding the safety shutter and intensity/blanking output signals.

Accordingly, In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

The invention claimed is:

1. A laser light projector safety control system comprising:
    means for monitoring a plurality of parameters of a laser light beam comprising a scanning laser light beam;
    the monitored parameters comprise:
        a power of the laser beam;
        a laser light beam scanning velocity
        a laser light beam scanning pathway size of the scan; and
        a height of the scanning laser light beam;
    a comparator for comparing the monitored parameters with a predetermined extreme value and for emitting a fault signal if at least one of the monitored parameters exceeds the predetermined extreme value;
    the comparator is adapted to emit the fault signal if the scanning pathway of the of the scan is below a predetermined value;
    a modulator for reducing a power of the laser light beam responsive to the fault signal; and
    the comparator is adapted to override a fault signal if the scanning laser beam height is above a level at which is expected to reside a human viewer.

2. The laser light projector safety control system recited in claim 1, wherein the modulator comprises a polychromatic acousto-optic modulator.

3. The laser light projector safety control system recited in claim 1, wherein the modulator is operable to reduce the laser light beam power to a value no greater than 1 milliwatt.

4. The laser light projector safety control system recited in claim 3, wherein the modulator is operable to reduce the laser light beam power to a value no greater than 1 milliwatt in no more than 10 microseconds from an issuance of the fault signal.

5. The laser light projector safety control system recited in claim 1, wherein the modulator comprises a power supply in signal communication with a laser emitting the laser light beam.

6. The laser light projector safety control system recited in claim 5, wherein the monitoring means comprises a power supply monitor operable to monitor a voltage level of the power supply.

7. The laser light projector safety control system recited in claim 1, wherein the comparator is adapted to receive a coordinate position signal, square the coordinate position signal, compare the squared coordinate position signal with a predetermined constant voltage value and, if the squared coordinate position signal is less than the predetermined constant voltage value for longer than a predetermined time, emit the fault signal.

8. The laser light projector safety control system recited in claim 1, wherein:
   the monitored parameters comprises a power of the laser beam downstream of the shutter after the fault signal has been emitted; and
   the comparator is adapted to emit the fault signal if the downstream laser power exceeds a predetermined value; and further comprising means for preventing laser output.

9. The laser light projector safety control system recited in claim 1, further comprising a means for directing a display device to display an indicium indicative of beam safety.

10. A method for controlling a safety of a laser light projector system comprising the steps of:
    monitoring a plurality of parameters of a laser light beam comprising a scanning laser light beam;
    the monitored parameters comprising:
       a power of the laser beam;
       a laser light beam scanning velocity;
       a laser light beam scanning pathway size;
       a height of the scanning laser light beam;
    comparing the monitored parameters with a predetermined extreme value;
    emitting a fault signal if the monitored parameter exceeds the predetermined extreme value;
    the emitting step comprises emitting the fault signal if the scanning pathway size is below a predetermined value;
    reducing the power of the laser light beam responsive to the fault signal; and
    the step of overriding a fault signal if the scanning laser light beam height is above a level at which is expected to reside a human viewer.

11. The method recited in claim 10, wherein the monitoring step comprises monitoring a voltage level of a power supply in signal communication with a laser emitting the laser light beam.

12. The method recited in claim 10, wherein the comparing step comprises:
    receiving a coordinate position signal;
    squaring the coordinate position signal;
    comparing the squared coordinate position signal with a predetermined constant voltage value; and
    if the squared coordinate position signal is less than the predetermined constant voltage value for longer than a predetermined time, emitting the fault signal.

13. The laser light projector safety control system recited in claim 1, further comprising means for directing a fault shutter to prevent the laser light beam from irradiating a predetermined location responsive to the fault signal.

14. The method recited in claim 10, further comprising a step of directing a fault shutter to prevent the laser light beam from irradiating a predetermined location responsive to the fault signal.

* * * * *